United States Patent [19]
Sharpe

[11] 4,085,585
[45] Apr. 25, 1978

[54] IMPACTION/INDUCTION JET ENGINE

[76] Inventor: Thomas H. Sharpe, Belvedere, S.C. 29841

[21] Appl. No.: 700,488

[22] Filed: Jun. 28, 1976

[51] Int. Cl.² ............................................. F02K 1/02
[52] U.S. Cl. ..................................... 60/262; 60/269; 60/39.52
[58] Field of Search ..................... 60/262, 269, 39.52

[56] References Cited
U.S. PATENT DOCUMENTS

| | | | |
|---|---|---|---|
| 3,323,304 | 6/1967 | Llobet et al. | 60/269 |
| 3,680,317 | 8/1972 | Kotoc | 60/269 |
| 3,800,529 | 4/1974 | Sharpe | 60/269 |
| 3,916,621 | 11/1975 | Amenta | 60/262 |

Primary Examiner—Robert E. Garrett
Attorney, Agent, or Firm—B. J. Powell

[57] ABSTRACT

An impaction/induction jet engine including generally a burner unit which discharges the exhaust gases therefrom through an air induction unit which causes fresh air to be induced into the exhaust gases. The induced fresh air is first drawn through a compressor section to cause a portion of the fresh air to be removed by impaction into the burner unit for combustion.

9 Claims, 19 Drawing Figures

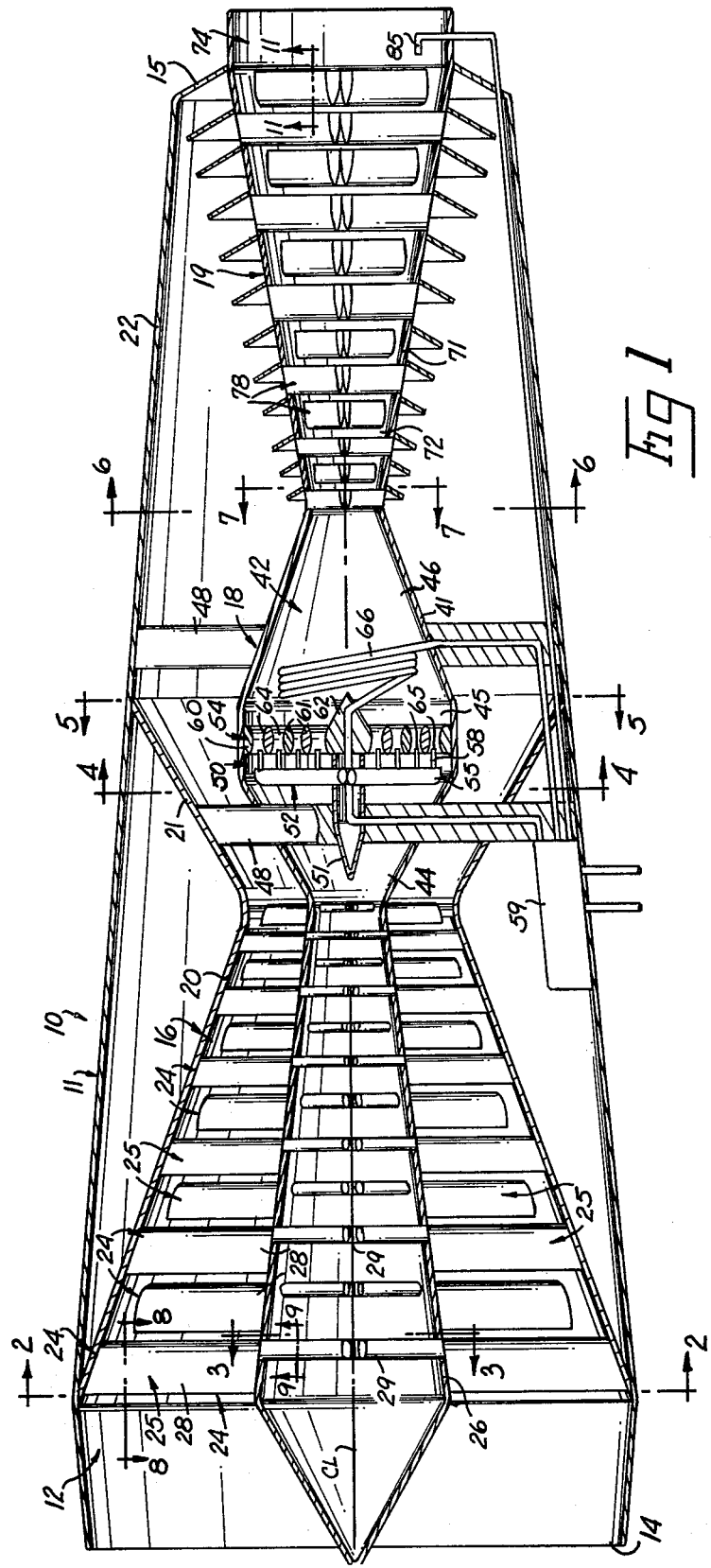

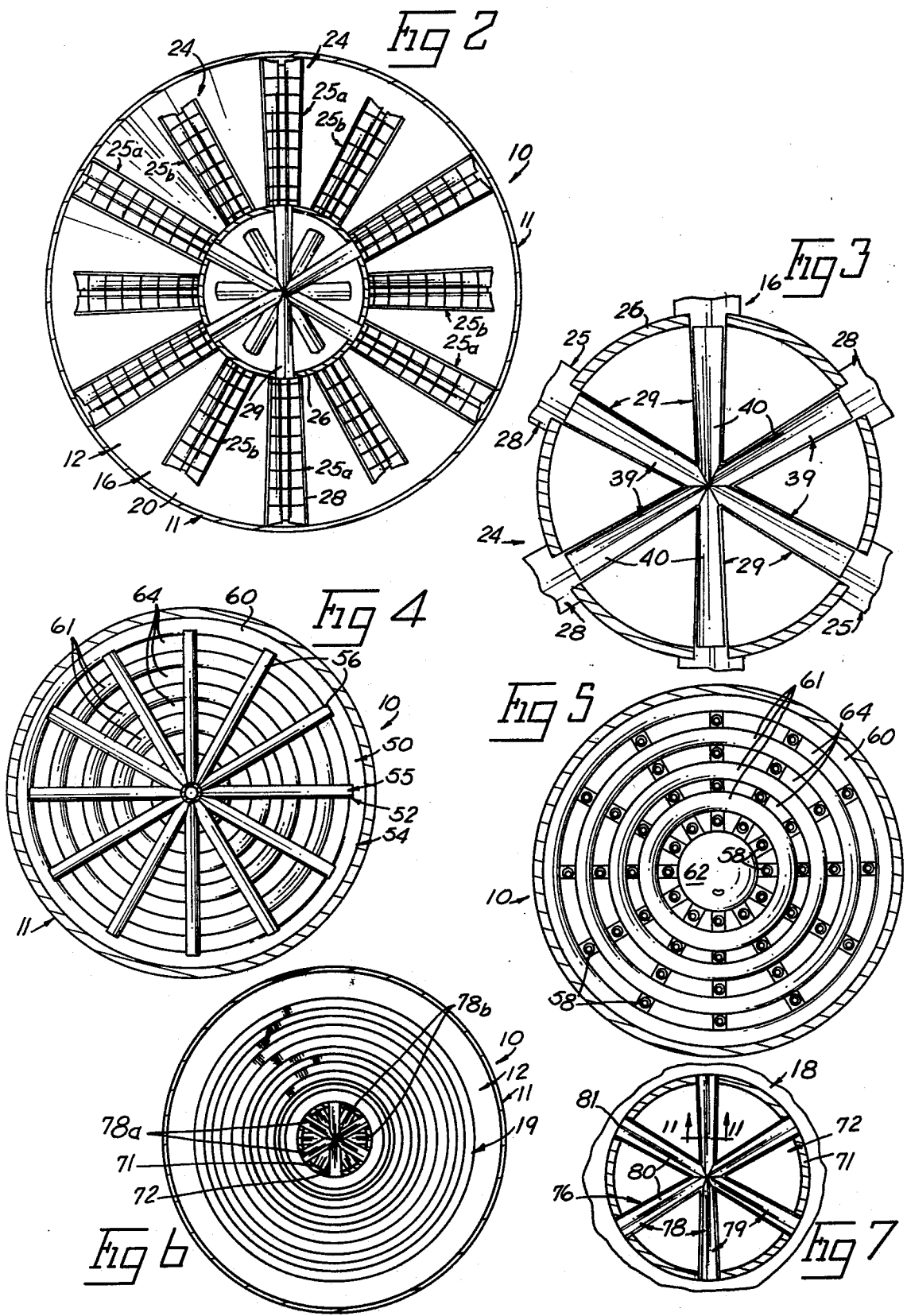

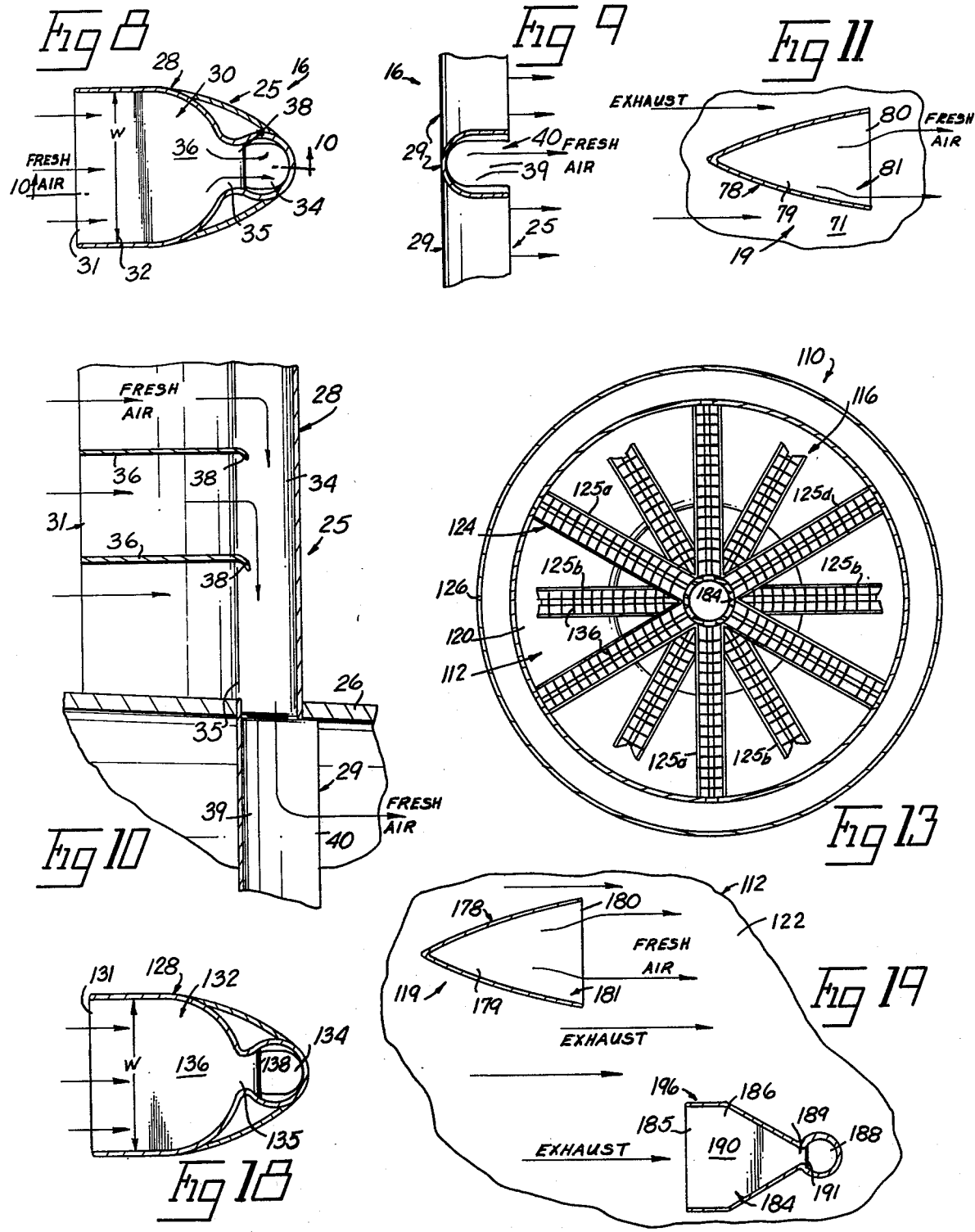

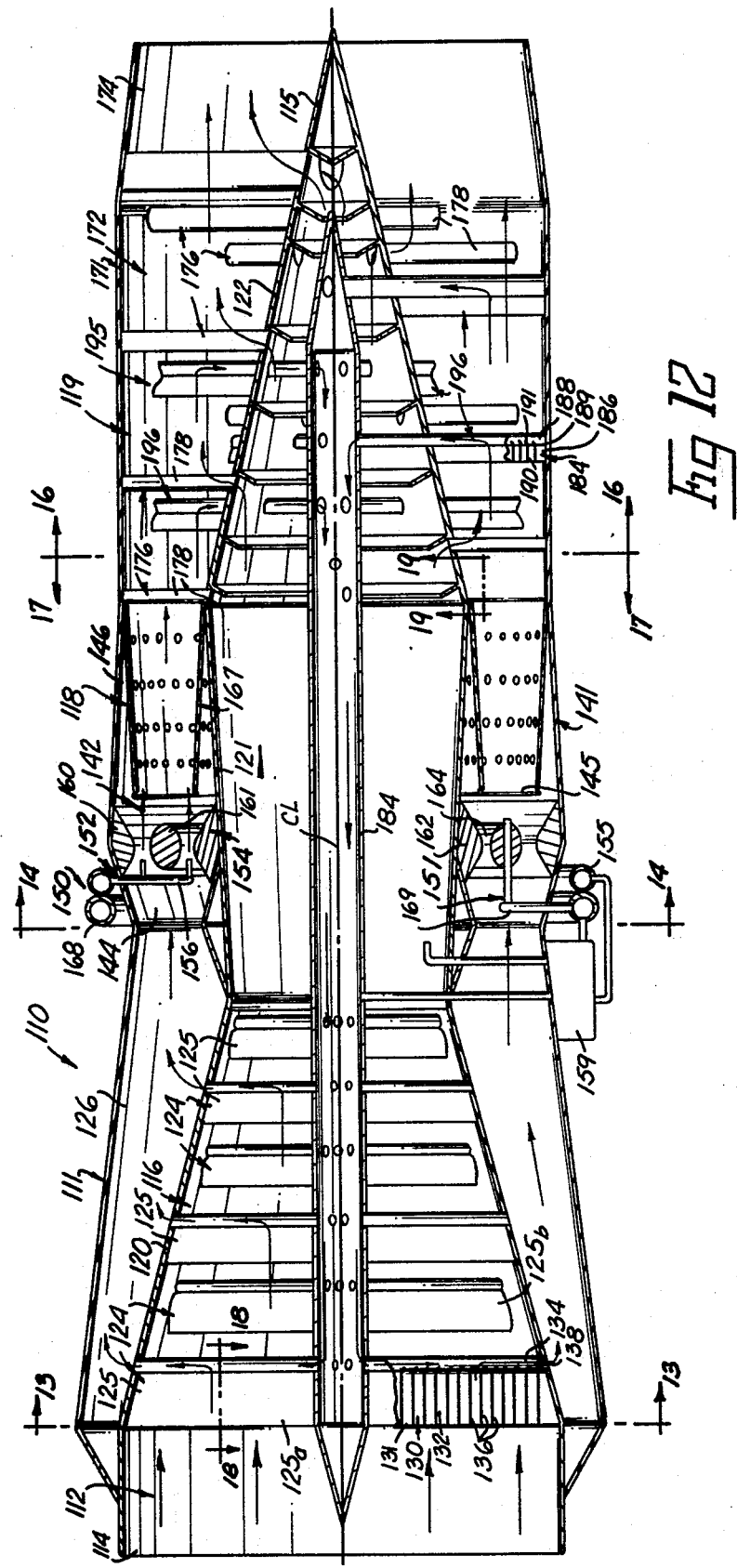

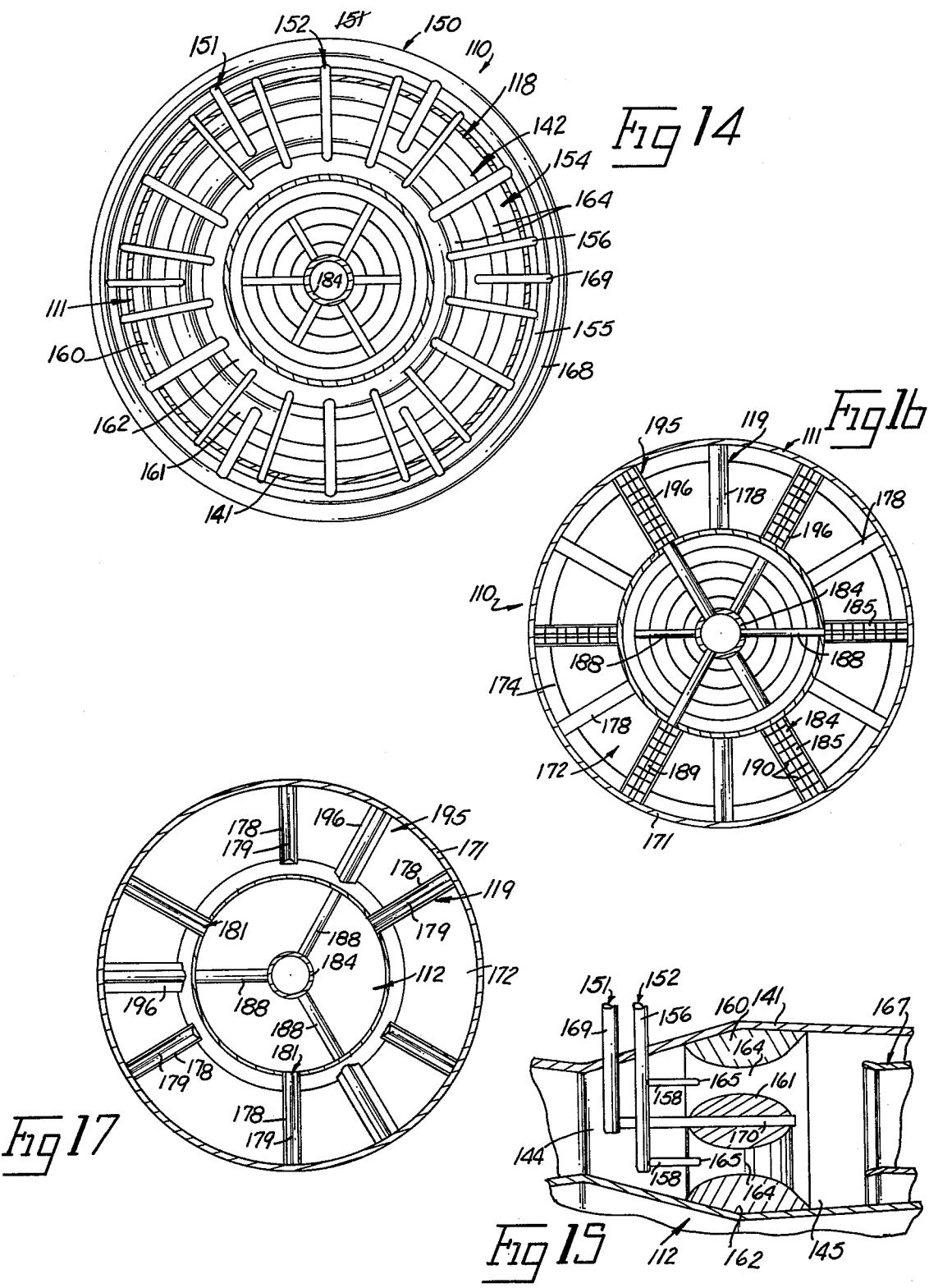

ness and extensive maintenance to keep the engine operating properly.

SUMMARY OF THE INVENTION

These and other problems associated with the prior art are overcome by the invention disclosed herein by providing a means for supplying air to the burner section of the engine which requires no rotating parts in the engine. The invention maintains operation while the engine is stationery or moving at slow speeds. Because of the lack of moving parts, the temperatures within the engine can be raised to produce a more effective operation.

The apparatus of the invention includes generally a burner unit which discharges the burned exhaust gases through an exhaust air induction unit that causes fresh air to be induced into the exhaust gases. As the fresh air is induced into the exhaust gases, it is caused to first pass through a compressor air impaction unit which separates a portion of the fresh air as it is moved toward the exhaust air induction unit through impaction and this separated portion of the fresh air is thus supplied to the inlet end of the burner unit. The fuel is supplied to the fresh air supplied to the burner unit by the compressor air impaction unit and burned. The fuel injector assembly in the burner unit is arranged to cause the air to be induced into the burner unit as the fuel is injected thereinto by jet pumping action.

The apparatus of the invention includes generally a fresh air duct which extends through the engine and is open to the atmosphere at its leading end. A compressor impaction unit is positioned in the upstream end of the fresh air duct with its downstream end connected to a burner unit. The downstream end of the burner unit is connected to an exhaust air induction unit which is connected both to the burner and the fresh air duct. The burner unit discharges the burned exhaust gases through the exhaust air induction unit which causes fresh air from the fresh air duct to be induced into the exhaust gas stream passing out of the engine. Because the exhaust air induction unit is connected to the fresh air duct downstream of the compressor impaction unit, the fresh air being drawn through the fresh air duct by the exhaust induction unit forces the fresh air through the compressor impaction unit. The compressor impaction unit is constructed to cause a portion of the fresh air being drawn into the fresh air duct to be impacted into the compressor impaction unit and this impacted portion of the fresh air is directed into the burner unit to supply the necessary air for combustion.

These and other features and advantages of the invention will become more fully understood upon consideration of the following specification and accompanying drawings wherein like characters of reference designate corresponding parts throughout the several views and in which:

BRIEF DESCRIPTION OF THE DRAWINGS

FIG. 1 is a longitudinal cross-sectional view of one embodiment of the invention;
FIG. 2 is a transverse cross-sectional view taken along line 2—2 in FIG. 1;
FIG. 3 is an enlarged cross-sectional view taken along line 3—3 in FIG. 1;
FIG. 4 is a transverse cross-sectional view taken along line 4—4 in FIG. 1;
FIG. 5 is a transverse cross-sectional view taken along line 5—5 in FIG. 1;
FIG. 6 is a transverse cross-sectional view taken along line 6—6 in FIG. 1;
FIG. 7 is an enlarged transverse cross-sectional view taken along line 7—7 in FIG. 1;
FIG. 8 is an enlarged transverse cross-sectional view taken along line 8—8 in FIG. 1;
FIG. 9 is an enlarged transverse cross-sectional view taken along line 9—9 in FIG. 1;
FIG. 10 is an enlarged transverse cross-sectional view taken along line 10—10 in FIG. 8;
FIG. 11 is an enlarged transverse cross-sectional view taken along line 11—11 in FIG. 7;
FIG. 12 is a longitudinal cross-sectional view of a second embodiment of the invention;
FIG. 13 is a transverse cross-sectional view taken along line 13—13 in FIG. 12;
FIG. 14 is a generally transverse cross-sectional view taken along line 14—14 in FIG. 12;
FIG. 15 is an enlarged cross-sectional view of the fuel injection assembly of FIG. 12;
FIG. 16 is a transverse cross-sectional view taken along line 16—16 in FIG. 12;
FIG. 17 is a transverse cross-sectional view taken along line 17—17 in FIG. 12;
FIG. 18 is an enlarged cross-sectional view taken along ling 18—18 in FIG. 12; and,
FIG. 19 is an enlarged cross-sectional view taken along line 19—19 in FIG. 12.

These features and the following detailed description disclose specific embodiments of the invention, however, it is to be understood that the inventive concept is not limited thereto since it may be embodied in other forms.

DETAILED DESCRIPTION OF ILLUSTRATIVE EMBODIMENT

Referring to FIGS. 1-11, it will be seen that the first embodiment of the invention is incorporated in an engine 10. The engine 10 comprises a tubular housing 11 which defines a fresh air duct 12 therethrough that is open to the atmosphere at its leading end 14 and closed at its trailing end 15. The fresh air duct 12 is concentrically located about the engine centerline CL. A compressor air impaction unit 16 is located in the fresh air duct 12 adjacent its leading end 14, a burner unit 18 is connected to the downstream end of the compressor air impaction unit 16 for receiving air from the impaction unit 16, and an exhaust air induction unit 19 is connected to the downstream exhaust of the burner unit 18 and is located within the fresh air duct 12 adjacent the trailing downstream end thereof. As the air fuel mixture in the burner unit 18 is burned, the exhaust gases discharge from the downstream end thereof and is forced through the exhaust air induction unit 19 which causes fresh air to be induced into the escaping exhaust gases through the air induction unit 19. The fresh air is drawn into the air induction unit 19 from the fresh air duct 12. As additional fresh air is drawn into the fresh air duct 12 from the upstream end 14 of the fresh air duct under the influence of the exhaust gases passing through the air induction unit 19, it will be seen that this fresh air being drawn through the duct 12 will be drawn through the compressor air impaction unit 16. The compressor air impaction unit 16 separates a portion of the fresh air being drawn through the duct 11 using impaction and this impacted fresh air is then forced into the leading end of the burner unit 18 to support combustion therein. It will be noted that the fresh air duct 12 defines a converging section 20 about the compressor air impaction unit 16, defines a diverging section 21 about the burner unit 18, and then defines a converging section 22 about the exhaust air induction unit 19.

It will be seen that the compressor air impaction unit 16 comprises a plurality of impaction vane assemblies 24 with the impaction vane assemblies 24 being serially arranged within the fresh air duct 12. It will be noted that each impaction vane assembly 24 includes a plurality of radially extended impaction vanes 25 which are circumferentially spaced about the converging section 20 of the fresh air duct 12. The impaction vane assemblies 24 are carried by a converging impaction duct 26 which is closed at its leading end and opens into the burner unit 18 at its trailing downstream end as best seen in FIG. 1. As best seen in FIG. 2, the impaction vanes 25 of each impaction vane assembly 24 are angularly offset with respect to the vanes 25 of the adjacent downstream vane assembly 24. For sake of clarity in FIG. 2, the impaction vanes 25 of the upstreammost assembly 24 are labelled $25_a$ while the next upstreammost assembly 24 has its impaction vanes labelled $25_b$. While the number of impaction vanes 25 may be varied in each assembly 24, six vanes 25 are shown in each assembly 24. As best seen in FIGS. 8-10, each impaction vane 25 includes an outboard section 28 which extends across the converging section 20 of duct 12 outboard of the impaction duct 26 and an inboard section 29 which extends inwardly from the impaction duct 26 to its center. As best seen in FIGS. 8 and 10, the outboard section 28 of each impaction vane 25 includes an impaction passage 30 therein radially extending with respect to the fresh air duct 12. The impaction passage 30 has a forwardly facing open mouth 31 thereto along the leading edge of the outboard section 28. The impaction passage 30 has a leading enlarged section 32 into which the mouth 31 opens and a trailing smaller section 34 which is connected to the enlarged section 32 through a reduced diameter throat 35. A plurality of air directing baffles 36 may be positioned in the enlarged section 32 of the impaction passage 30 and oriented generally normal to the radial axis along which the impaction vane 25 lies. Each of the air directing baffles 36 terminate just rearwardly of the reduced diameter throat 35 and may be provided at its trailing end with an inwardly directly lip 38 to deflect the air moving from the enlarged section 32 into the smaller section 34 generally inwardly along the smaller section 34 as will become more apparent.

The inboard section 29 of each impaction vane 25 defines a radially extending transfer passage 39 therein which communicates with the smaller section 34 of the impaction passage 30 and corresponds generally in cross-sectional shape to the smaller section 34. The trailing edge of the transfer passage 39 communicates with the interior of the impaction duct 26 through a rearwardly facing discharge opening 40 so that the fresh air separated from the fresh air passing through the fresh air duct 12 by the outboard section 28 of each impaction vane 25 and forced inwardly through the smaller section 34 of the impaction passage 30 passes into the transfer passage 39 and subsequently rearwardly outwardly therefrom into the impaction duct 26 through the discharge opening 40. It will thus be seen that the higher the velocity of the fresh air passing through the fresh air duct, the higher will be the pressure generated in the impaction duct 26 by the fresh air being impacted into the outboard section 28 of the impaction vane 25 and transferred therefrom into the impaction duct 26 by the inboard section 29 of the vane 25. It will also be noted that the width W of the mouth 31 into the enlarged section 32 of the impaction passage 30 may increase as one moves outwardly along the length of the outboard section 28 of the vane 25 as best seen in FIG. 2. Further, because the vanes 25 of each vane assembly 24 are offset with respect to the vanes 25 of the next downstream vane assembly 24, each vane assembly 24 does not significantly interfere with the operation of the next downstream vane assembly 24.

The burner unit 18 best seen in FIG. 1 comprises generally a tubular burner duct 41 defining a burner passage 42 therethrough. The burner passage 42 has a leading diverging section 44 which is connected to the downstream end of the impaction duct 26 so that the fresh air separated from the fresh air duct 12 by the compressor air impaction unit 16 will be discharged into the burner passage 42 through the leading diverging section 44. The burner passage 42 further has a central burner section 45 which communicates with the trailing downstream end of the diverging section 44 and a trailing converging section 46 communicating with the downstream end of the central section 42. Appropriate struts 48 mount the burner duct 41 concentrically about the centerline CL of the engine 10. A fuel injection assembly 50 is located within the central burner section 45 of the burner passage 42. This is best seen in FIGS. 1, 4 and 5. The fuel injection assembly 50 includes a central support 51 centrally mounted within the burner passage 42 and which mounts thereon a fuel injection unit 52 and a throat assembly 54 immediately downstream of the fuel injection unit 52. The fuel injection unit 52 comprises a manifold 55 with radially extending manifold tubes 45 circumferentially spaced about the central section 45 of the burner passage 42. Each radially extending manifold tube 56 is provided with a plurality of rearwardly extending injection nozzles 58 so that fuel supplied to the manifold 55 from a fuel control unit 59 is discharged rearwardly from the injection nozzles 58 along paths generally parallel to the centerline CL of the engine 10. The throat assembly 54 includes an annular ring 60 mounted on the inside of the burner duct 41 in the central section 45 of the burner passage 42 and a plurality of intermediate annular rings 61 concentrically located with respect to each other and the outside ring and lying in a generally common plane normal to the centerline CL of the engine 10. The throat assembly 54 further includes a central plug 62 centrally of the intermost intermediate ring 61. The outside ring 60, the intermediate rings 61 and the central plug 62 are constructed and arranged to form converging-diverging annular throats 64 therebetween. The injection nozzles 58 are arranged to discharge the fuel through the converging-diverging throats centrally thereof with the discharge end 65 of each of the injection nozzles located just forwardly of the throat 64 so that as the fuel is discharged through the throat 64, air will be forced through the throat 64 due to the jet pumping action of the fuel passing therethrough to produce a combustible air fuel mixture in the burner passage 42 downstream of the throat 64 of the throat assembly 54. An appropriate igniter plug assembly (not shown) will be provided downstream of the throat 64 to ignite the air-fuel mixture in the burner passage 42 for burning. It will be noted that the fuel can pass directly from the fuel control unit 59 into the manifold 55 for dischage through the injection nozzle 58 or may first pass through a preheater section 66 as best seen in FIG. 1.

The exhaust air induction unit 19 is connected to the discharge end of the burner duct 41 and includes a diverging duct 71 seen in FIGS. 1, 6 and 7 defining a diverging induction passage 72 therethrough which is concentric about the centerline CL of the engine 10. The downstream discharge end of the diverging induction duct 71 is connected to an exhaust nozzle 74 through which the exhaust gases from the burner unit 18 are ultimately discharged. The exhaust air induction unit 19 further includes a plurality of induction vane assemblies 76 of induction vanes 78 where the assemblies 76 are serially arranged along the duct 71 in the passage 72. Each vane assembly 76 is oriented generally normal to the centerline CL of the engine 10 and the induction vanes 78 extend radially outwardly from the centerline CL at circumferentially spaced positions about the induction duct 71. As best seen in FIG. 6, the induction vanes 78 of each induction vane assembly 76 are angularly offset with respect to the induction vanes 78 of the adjacent downstream vane assembly 76. For sake of clarity in FIG. 6, the induction vanes 78 of the upstreammost assembly 76 are labelled $78_a$ while the next upstreammost assembly 76 has its induction vanes labelled $78_b$. While the number of induction vanes 78 may be varied in each assembly 76, six vanes are shown in each assembly 76. Each of the induction vanes 78 define a generally radially extending induction passage 79 which opens into the converging section 22 of the fresh air duct 12 at its outer end through induction intake opening 81 in duct 71 and defines a downstream rearwardly facing induction opening 80 thereto along the trailing edge thereof. This is best illustrated in FIGS. 7 and 11. Further, because the vanes 78 of each vane assembly 76 are offset with respect to the vanes 78 of the next downstream vane assembly 76, each vane assembly 76 does not significantly interfere with the operation of the next downstream vane assembly 76. Thus, it will be seen that the discharging exhaust gases passing through the divering passage 72 flow around the induction vanes 78 to cause fresh air in the converging section 22 of the fresh air duct 12 to be induced into the rearwardly discharging exhaust stream through the induction intake openings 81 through the induction duct 71, the induction passage 79 in the induction vane 78 and finally out through the induction discharge opening 80 in the trailing edge of the induction vane 78. A static pressure pick-up tube 85 may be positioned in the exhaust nozzle 74 to supply operating pressure to the fuel control unit 59 as is known in the art.

During start up, fuel is forced out of the fuel injection nozzles 58 through the converging-diverging throat 64 of the throat assembly 54 with sufficient velocity to induce fresh air from the fresh air duct 12 through the impaction vanes 25 and the impaction duct 26 into the burner passage 42 rearwardly of the fuel injection assembly 50 to support combustion. The air-fuel mixture is then ignited so that the exhaust gases are discharged rearwardly out of the converging section 46 of the burner unit 18 through the diverging induction passage 72 in the exhaust air induction unit 19 and finally out through the exhaust nozzle 74. As the exhaust gases pass through the vane assemblies 76, this causes fresh air from the fresh air duct 12 to be induced into the discharging exhaust gas stream through the induction vanes 78. This serves to draw additional fresh air into fresh air duct 12 through the leading intake end 14 thereof. As this additional fresh air flows through the converging section 20 of the fresh air duct 12, it passes through the air impaction unit 16 so that a portion of the incoming fresh air impacts into the impaction vanes 25 whereupon it is forced into the impaction duct 26 to raise the pressure in the impaction duct 26 and thus force additional fresh air into the burner unit 18. This serves to raise the pressure in the burner unit 18 and thus increases the thrust output from the engine 10 by increasing the exhaust velocity. This increase in exhaust velocity serves to further increase the amount of fresh air induced through the duct 12 until the point is reached that the thrust output and air intake into the engine 10 stabilizes by controlling the amount of fuel injected into the burner unit 18 through the injection nozzles 58.

It will be appreciated that the size of the fresh air duct 12, the impaction duct 26, the burner passage 42 and the induction passage 72 may be varied to supply the necessary fresh air and control the exhaust gas flow to operate the engine. Further, the size and number of vanes 25 in impaction unit 16, vanes 78 in induction unit 19, and the annular throats 64 and nozzles 58 in injection assembly 50 may be varied to operate the engine.

The static pressure pick-up tube 85 which drives the fuel control unit 59 may be an impaction vane similar to the impaction vanes 25. This would increase the driving pressure to the fuel control unit 59. Also, an appropriate flame holder may be incorporated in the burner passage 42 to insure that the flame will be held therein.

SECOND EMBODIMENT

Referring to FIGS. 12-17, it will be seen that the second embodiment of the invention is incorporated in an engine 110. The engine 110 comprises a tubular housing 111 which defines a fresh air duct 112 therethrough that is open to the atmosphere at its leading end 114 and closed at its trailing end 115. The fresh air duct 112 is concentrically located about the engine centerline CL. A compressor air impaction unit 116 is located in the fresh air duct 112 adjacent its leading end 114, an annular burner unit 118 is connected to the downstream end of the compressor air impaction unit 116 for receiving air from the impaction unit 116, and an annular exhaust air induction unit 119 is connected to the downstream exhaust of the burner unit 118 and is connected to the fresh air duct 112 adjacent the trailing downstream end thereof. As the air fuel mixture in the burner unit 118 is burned, the exhaust gases discharge from the downstream end thereof and are forced through the exhaust air induction unit 119 which causes fresh air to be induced into the escaping exhaust gases through the air induction unit 119. The fresh air is drawn into the air induction unit 119 from the fresh air duct 112. As additional fresh air is drawn into the fresh air duct 112 from the upstream end 114 of the fresh air duct under the influence of the exhaust gases passing through the air induction unit 119, it will be seen that this fresh air being drawn through the duct 112 will be drawn through the compressor air impaction unit 116. The compressor air impaction unit 116 separates a portion of the fresh air being drawn through the duct 112 using impaction and this impacted fresh air is then forced into the leading end of the burner unit 118 to support combustion therein. It will be noted that the fresh air duct 112 defines a converging section 120 at the compressor air impaction unit 116, defines a diverging section 121 at the burner unit 118, and then defines a converging section 122 at the exhaust air induction unit 119.

It will also be noted that an exhaust return impaction unit 195 is located at the air induction unit 119 so that the exhaust gases also pass through the impaction unit 195. The return impaction unit 195 separates a portion of both the exhaust gases and the fresh air induced into that exhaust gases using impaction and the impacted exhaust gas and fresh air is then forced through the compressor air impaction unit 116 to cause additional fresh air to be separated from the fresh air duct 112 and forced into burner unit 118.

It will be seen that the compressor air impaction unit 116 comprises a plurality of impaction vane assemblies 124 with the impaction vane assemblies 124 being serially arranged within the fresh air duct 112. It will be noted that each impaction vane assembly 124 includes a plurality of radially extended impaction vanes 125 which are circumferentially spaced about the converging section 120 of the fresh air duct 112. The impaction vane assemblies 124 communicate at their outboard ends with an annular diverging impaction duct 126 which is closed at its leading end and opens into the burner unit 118 at its trailing downstream end as best seen in FIG. 12. As best seen in FIG. 13, the impaction vanes 125 of each impaction vane assembly 124 are angularly offset with respect to the impaction vanes 125 of the adjacent downstream vane assembly 124. For sake of clarity in FIG. 13, the impaction vanes 125 of the upstreammost assembly 124 are labelled 125$_a$ while the next upstreammost assembly 124 has its impaction vanes labelled 125$_b$. While the number of impaction vanes 125 may be varied in each assembly 124, six vanes 125 are shown in each assembly 124. As best seen in FIGS. 12 and 18, each impaction vane 125 extends generally across the converging section 120 of duct 112 and includes an impaction passage 130 therein radially extending with respect to the fresh air duct 112. The impaction passage 130 has a forwardly facing open mouth 131 thereto along the leading edge of the vane 125. The impaction passage 130 has a leading section 132 into which the mouth 131 opens and a trailing smaller section 134 which is connected to the enlarged section 132 through a reduced diameter throat 135. A plurality of air directing baffles 136 may be positioned in the enlarged section 132 of the impaction passage 130 and oriented generally normal to the radial axis along which the impaction vane 125 lies. Each of the air directing baffles 136 terminate just rearwardly of the reduced diameter throat 135 and may be provided at its trailing end with an outwardly directed lip 138 to deflect the air moving from the enlarged section 132 into the smaller section 134 generally outwardly along the smaller section 134 as will become more apparent. The outboard end of the smaller section 134 extends through the wall of duct 112 and communicates with the impaction duct 126 so that the fresh air separated from fresh air passing through the fresh air duct 112 by each impaction vane 25 and forced outwardly through the smaller section 134 of the impaction passage 130 passes therefrom into the impaction duct 126. It will thus be seen that the higher the velocity of the fresh air passing through the fresh air duct 112, the higher will be the pressure generated in the impaction duct 126 by the fresh air being impacted into the impaction vanes 125 and transferred therefrom into the impaction duct 26. It will also be noted that the width W of the mouth 131 into the enlarged section 132 of each impaction passage 130 may be constant as shown or may increased as one moves outwardly along the length of the vane 125 as shown in engine 10. Further, because the vanes 125 of each vane assembly 124 are offset with respect to the vanes 125 of the next downstream vane assembly 124, each vane assembly 124 does not significantly interfere with the operation of the next downstream vane assembly 124.

The burner unit 118 best seen in FIGS. 12, 14 and 15 comprises generally a tubular burner duct 141 concentric about duct 112 and defining an annular burner passage 142 between duct 141 and duct 112. The burner passage 142 has a leading annular diverging inlet section 144 which is connected to the downstream end of the impaction duct 126 so that the fresh air separated from the fresh air duct 112 by the compressor air impaction unit 116 will be discharged into the burner passage 142 through the leading diverging section 144. The burner passage 142 further has a central annular burner section 145 which communicates with the trailing downsteam end of the divergin section 144 and a trailing converging section 146 communicating with the downstream end of the central section 142. A fuel injection assembly 150 is located within the central burner section 145 of the burner passage 142. This is best seen in FIGS. 12, 14 and 15. The fuel injection assembly 150 includes low speed fuel injection unit 152 and a high speed fuel injection unit 151. A throat assembly 154 is located immediately downstream of the low speed fuel injection unit 152. The low speed fuel injection unit 152 comprises an annular low speed manifold 155 with radially inwardly extending manifold tubes 156 circumferentially spaced about the central section 145 of the burner passage 142. Each radially extending manifold tube 156 is provided with a plurality of rearwardly extending injection nozzles 158 so that fuel supplied to the manifold 155 from a fuel control unit 159 is discharged rearwardly from the injection nozzles 158 along paths generally parallel to the centerline of the passage 142. The throat assembly 154 includes an outer annular ring 160 mounted on the inside of the burner duct 141 in the central section 145 of the burner passage 142, an intermediate annular ring 161 concentrically located with respect to the outside ring 160, and an inner annular ring 162 mounted on the outside of the fresh air duct 112 in the central section 145 of the burner passage 142 so that the rings 160, 161 and 162 lie in a generally common plane generally normal to the centerline CL of the engine 110. The outside ring 160, the intermediate ring 161 and the inner ring 162 are constructed and arranged to form converging-diverging annular throats 164 therebetween. The low speed injection nozzles 158 are arranged to discharge the fuel through the converging-diverging throats 164 centrally thereof with the discharge end 165 of each of the injection nozzles 158 located just forwardly of the throat 164 so that as the fuel is discharged through the throat 164, air will be forced through the throat 154 due to the jet pumping action of the fuel passing therethrough to produce a combustible air-fuel mixture in the burner passage 142 downstream of the throats 164 of the throat assembly 154. An appropriate igniter plug assembly (not shown) will be provided downstream of the throat 164 to ignite the air-fuel mixture in the burner passage 142 for burning. The high speed fuel injection unit 151 includes an annular high speed manifold 168 with radially inwardly extending manifold tubes 169 circumferentially spaced about the central section 145 of the passage 142. Each radially extending manifold tube 169 is provided with a rearwardly extending injection nozzle 170 which extends through the intermediate ring 161 so that fuel supplied to the manifold 168 from the fuel control unit 159 is discharged rearwardly from the injection nozzles 170 behind the throat assembly 154. It will be noted that the fuel can pass directly from the fuel control unit 159 into either or both of the manifolds 155 and 168 for discharge through the injection nozzles as seen in FIG. 12 or may first pass through a preheater section.

The burner unit 18 further includes a diverging annular burner can assembly 167 best seen in FIG. 12 in which the air-fuel mixture is burned. The burner can assembly 167 performs its usual function and will not be described in detail.

The exhaust air induction unit 119 is connected to the discharge end of the burner duct 141 and includes a duct 171 seen in FIG. 12 defining an annular diverging induction passage 172 between duct 171 and the converging portion 122 of fresh air duct 112 which is concentric about the centerline CL of the engine 10. The downstream discharge end of the diverging induction passage 171 is connected to an exhaust nozzle 174 through which the exhaust gases from the burner unit 18 are ultimately discharged. The exhaust air induction unit 119 further includes a plurality of induction vane assemblies 176 of induction vanes 178 where the assemblies 176 are serially arranged along the passage 172. Each vane assembly 176 of induction vanes 178 is oriented generally normal to the centerline CL of the engine 110 and the induction vanes 178 extend radially outwardly from the centerline CL at circumferentially spaced positions about the induction duct 171. As best seen in FIG. 16, the induction vanes 178 of each induction vane assembly 176 are angularly offset with respect to the vanes 178 of the adjacent downstream vane assembly 176. While the number of induction vanes 178 may be varied in each assembly 176, three vanes are shown in each assembly 176. Each of the induction vanes 178 as seen in FIG. 19 define a generally radially extending induction passage 179 which opens into the converging section 122 of the fresh air duct 112 at its inner end through induction intake opening 181 in fresh air duct 112 seen in FIG. 12 and defines a downstream rearwardly facing induction opening 180 thereto along the trailing edge thereof seen in FIG. 19. Further, because the vanes 178 of each vane assembly 176 are offset with respect to the vanes 178 of the next downstream vane assembly 176, each vane assembly 176 does not significantly interfere with the operation of the next downstream vane assembly 176. Thus, it will be seen that the discharging exhaust gases passing through the diverging passage 172 flow around the induction vanes 178 to cause fresh air in the converging section 122 of the fresh air duct 112 to be induced into the rearwardly discharging exhaust stream through the induction intake openings 181, the induction passage 179 in the induction vane 178 and finally out through the induction discharge openings 180 in the trailing edge of the induction vanes 178.

The exhaust return impaction unit 195 comprises a plurality of return impaction vane assemblies 196 with the impaction vane assemblies 196 being serially arranged within the diverging induction passage 172 between the induction vanes 178 as seen in FIG. 12. It will be noted that each return impaction vane assembly 196 includes a plurality of radially extended return impaction vanes 182 which are circumferentially spaced about the diverging induction passage 172 as seen in FIG. 16. The impaction vane assemblies 196 communicate at their inboard ends with return impaction duct 184 which is closed at its leading and trailing ends as best seen in FIG. 12. As best seen in FIG. 16, the return impaction vanes 182 of each impaction vane assembly 196 are angularly offset with respect to the vanes 182 of the adjacent downstream vane assembly 196 and also the vanes 178 of the induction vane assemblies 176. While the number of impaction vanes 182 may be varied in each assembly 196, three vanes 182 are shown in each assembly 196. As best seen in FIGS. 12, 16 and 19, each impaction vane 182 extends generally across the diverging passage 172 and includes a return impaction passage 184 therein radially extending with respect to the passage 172. The return impaction passage 184 has a forwardly facing open mouth 185 thereto along the leading edge of the vane 182. The return impaction passage 184 has a leading enlarged section 186 into which the mouth 185 opens and a trailing smaller section 188 which is connected to the enlarged section 186 through a reduced diameter throat 189 seen in FIG. 19. A plurality of exhaust directing baffles 190 may be positioned in the enlarged section 186 of the impaction passage 184 and oriented generally normal to the radial axis along which the impaction vane 182 lies. Each of the exhaust directing baffles 190 terminate just rearwardly of the reduced diameter throat 189 and may be provided at its trailing end with an inwardly directed lip 191 to deflect the exhaust gases moving from the enlarged section 186 into the smaller section 188 generally inwardly along the smaller section 188 as will become more apparent. The inboard end of the smaller section 188 extends through the wall of fresh air duct 112 and communicates with the trailing portion of the return impaction duct 184. This causes the exhaust gases and/or induced fresh air in diverging passage 172 that impacts in vanes 182 to be forced inwardly through the smaller section 188 to the return impaction duct 184. The impacted exhaust gases and/or induced fresh air then flows forwardly along duct 184 and outwardly along the smaller sections 134 in the impaction vanes 125 since the inboard ends of the smaller sections 134 of impaction passage 130 in the compressor impaction vanes 125 communicate with the leading portion of the return impaction duct 184. It will thus be seen that the higher the velocity of the exhaust gases passing through the induction passage 171, the higher will be the pressure generated in the return impaction duct 184 by the exhaust gases being impacted into the impaction vanes 182 and transferred therefrom into the impaction duct 184. As the impacted portion of the exhaust gases flow outwardly through the smaller sections 134 in vanes 125, the lips 138 on baffles 136 serve to confine the returned exhaust gases within the smaller section 134 of compressor vanes 125 and also to cause additional fresh air to be induced in the smaller section 134 from the enlarged sections 132 in vanes 125 by the jet pumping action of the exhaust gases as they flow past the lips 138. This additional fresh air is mixed with the exhaust gases and then discharged into the impaction duct 126 for passage to burner unit 118.

During start up, the fuel is forced out of the low speed fuel injection nozzles 158 through the converging-diverging throats 164 of the throat assembly 154 with sufficient velocity to induce fresh air from the fresh air duct 112 through the impaction vanes 125 and the impaction duct 126 into the burner passage 142 rearwardly of the fuel injection assembly 150 to support combustion. The air-fuel mixture is then ignited so that the exhaust gases are discharged rearwardly out of the converging section 146 of the burner unit 118 through the diverging induction passage 172 in the exhaust air induction unit 119 and exhaust impaction unit 180, and finally out through the exhaust nozzle 174. As the exhaust gases pass through the vane assemblies 176, fresh air from the fresh air duct 112 is induced into the discharging exhaust gas stream through the induction vanes 178. This serves to draw additional fresh air into fresh air duct 112 through the leading intake end 114 thereof. As this additional fresh air flows through the converging section 120 of the fresh air duct 112, it passes through the air impaction section 116 so that a portion of the incoming fresh air impacts into the impaction vanes 125 whereupon it is forced into the impaction duct 126 to raise the pressure in the impaction duct 126 and thus force additional fresh air into the burner unit 118. This serves to raise the pressure in the burner unit 118 and thus increases the thrust output from the engine 110 by increasing the exhaust velocity. This increase in exhaust velocity serves to further increase the amount of fresh air induced through the duct 112.

It will also be noted that a portion of the exhaust gases discharging rearwardly through the induction passage 172 will impact into the return impaction vanes 182 of the return impaction unit 195. The impacted portion of the exhaust gases are thus separated from the main exhaust gas stream and are forced inwardly along the vanes 182 into the return impaction duct 184. It will be noted that if fresh air has been induced into the exhaust gases prior to reaching the vanes 182, a portion of this induced fresh air will likewise be separated by impaction in the impaction vanes 182. As the separated exhaust gases and any induced fresh air are forced into return duct 184, they flow forwardly along the duct 184 and into the inboard ends of the impaction vanes 125 in the compressor air impaction unit 116. This serves to force the separated exhaust gases out through the smaller sections 134 of compressor impaction vanes 125 under the influence of the lips 138 on baffles 136 and into the impaction duct 126 to the burner unit 118. The jet pumping action of the exhaust gases as they flow through the smaller section 134 of the vanes 125 causes fresh air from the fresh air duct 112 to be drawn through the mouths 131 in vanes 125 into the exhaust gases passing along the vanes 125. This, of course, induces additional fresh air into the impaction duct 126 for passage to burner unit 118.

When sufficient fresh air is supplied to the burner unit 118 to support combustion without the jet pumping action generated by the low speed fuel injection unit 152, the fuel injection may be transferred from the low speed fuel injection unit 152 to the high speed fuel injection unit 151. It will also be noted that the fuel may be injected by both the low speed and the high speed fuel injection units 151 and 152. It will be noted that the number and size of the nozzles 158 on the low speed fuel injection unit 152 are such that the pressure will be maintained in the air-fuel mixture. Further, all of the air and/or exhaust gas passages should be smooth to reduce friction losses.

It will further be appreciated that there may be more than one fresh air duct. The positions of the compressor air impaction unit, the burner unit, and the exhaust induction unit may be changed to make a more compact engine. When the return impaction unit 195 is used, sufficient fresh air may be induced into the exhaust gases by the induction unit 119 prior to impaction in unit 195 to support combustion and this impacted exhaust gas/fresh air mixture supplied directly to the burner unit 118.

I claim:

1. An impaction and induction jet engine comprising:
   a fresh air duct having a leading end and a trailing end, said fresh air duct open to the atmosphere at its leading end and closed at its trailing end;
   a burner unit having a burner inlet and a burner outlet;
   a compressor air impaction unit associated with said fresh air duct adjacent its leading end, said compressor air impaction unit including a plurality of air impaction vanes positioned in said fresh air duct and an impaction duct communicating with said burner inlet and said air impaction vanes, each of said air impaction vanes defining an air impaction passage therein, a forwardly facing air inlet opening to said air impaction passage in said fresh air duct, and an air outlet opening from said air impaction passage to said impaction duct so that a portion of the fresh air flowing through said fresh air duct will impact in said air impaction passage and be transferred to said impaction duct so that the separated portion of the fresh air in said impaction duct will be received through the burner inlet;
   fuel injector means for injecting fuel into said burner unit to form a combustible air-fuel mixture in said burner unit so that the exhaust gases will be directed out of said burner outlet; and,
   an air induction unit connected to said burner unit for receiving the exhaust gases from said burner outlet, said air induction unit connected to said fresh air duct adjacent its trailing end and constructed and arranged to cause fresh air from said fresh air duct to be induced into the exhaust gases as the gases pass through said air induction unit and cause additional fresh air from the atmosphere to be drawn into said fresh air duct and through said compressor air impaction unit.

2. The jet engine of claim 1 further including a return exhaust impaction unit connected to said burner outlet so that the exhaust gases pass therethrough, said exhaust impaction unit having a plurality of impaction inlets for separating a portion of the exhaust gases passing through said exhaust impaction unit by impaction, said exhaust impaction unit operatively connected to said compressor air impaction unit to force the separated portion of the exhaust gases through said air impaction unit and induce additional fresh air from said fresh air duct means into said air impaction unit.

3. The jet engine of claim 1 wherein said air impaction passage in each of said air impaction vanes includes a leading larger section connected to said air inlet opening at its leading portion, a trailing smaller section smaller in cross-sectional size than said larger section, and a throat connecting the trailing portion of said larger section with the leading portion of said smaller section, said smaller section communicating with said air outlet opening so that fresh air from said fresh air duct means will pass through said larger section and into said smaller section through said throat.

4. The jet engine of claim 3 further including baffle means located within each said air impaction passage for directing the flow of fresh air through said larger section into said smaller section.

5. The jet engine of claim 4 wherein said baffle means includes a plurality of baffles in each said air impaction passage in said air impaction vanes oriented generally normal to the central axis of said air impaction passage for directing the flow of fresh air through said larger section of said impaction passage generally normal to the central axis of said air impaction passage, each of said baffles including a curved lip in said smaller section of said air impaction passage for deflecting the fresh air flowing into said smaller section of said air impaction passage from said larger section so that the fresh air flows axially along said smaller section toward said impaction duct.

6. The jet engine of claim 2 wherein said return exhaust impaction unit includes a plurality of exhaust impaction vanes positioned in the exhaust gas stream and a return impaction duct communicating with said compressor air impaction unit and said exhaust impaction vanes, each of said exhaust impaction vanes defining an exhaust impaction passage therein, a forwardly facing exhaust inlet opening to said impaction passage in the exhaust gas stream, and an exhaust outlet opening from said exhaust impaction passage to said exhaust impaction duct so that a portion of the exhaust gases passing through said exhaust impaction unit will impact in said exhaust impaction passage and be transferred to said return impaction duct to be forced through said air impaction unit and induce additional fresh air into said burner inlet.

7. The jet engine of claim 5 further including a return exhaust impaction unit connected to said burner outlet so that the exhaust gases pass therethrough, said exhaust impaction unit including a plurality of exhaust impaction vanes positioned in the exhaust gas stream and a return impaction duct communicating with said compressor air impaction unit and said exhaust impaction vanes; each of said exhaust impaction vanes defining an exhaust impaction passage therein, a forwardly facing exhaust inlet opening to said impaction passing in the exhaust gas stream, and an exhaust outlet opening from said exhaust impaction passage to said exhaust impaction duct; said exhaust impaction passage in each of said exhaust impaction vanes including a leading larger section connected to said exhaust inlet opening at its leading portion, a trailing smaller section smaller in cross-sectional size than said larger section, and a throat connecting the trailing portion of said larger section with the leading portion of said smaller section, said smaller section communicating with said exhaust outlet opening so that a portion of the exhaust gases flowing through said exhaust impaction unit will impact in said exhaust impaction passage and through the smaller section of said exhaust impaction passage into said exhaust impaction duct; said exhaust impaction duct communicating with that end of said smaller section of said air impaction vanes opposite said air impaction duct to cause the impacted exhaust gases to flow along said smaller sections in said air impaction vanes under the influence of said lips on said baffles toward said air impaction duct to induce additional fresh air into said smaller section of said air impaction vanes and force the induced additional fresh air toward said air impaction duct.

8. An impaction and induction jet engine comprising:
a fresh air duct having a leading end and a trailing end, said fresh air duct open to the atmosphere at its leading end and closed at its trailing end;
a burner unit having a burner inlet and a burner outlet;
a compressor air impaction unit associated with said fresh air duct adjacent its leading end, said compressor air impaction unit having a plurality of impaction inlets and an impaction outlet, said impaction inlets located in said fresh air duct adjacent its leading end and effective to separate a portion of the fresh air flowing through said fresh air duct by impaction and discharging the separated portion of the fresh air from said impaction outlet into the burner inlet;
fuel injector means for injecting fuel into said burner unit to form a combustible air-fuel mixture in said burner unit so that the exhaust gases will be directed out of said burner outlet; and,
an air induction unit connected to said burner unit for receiving the exhaust gases from said burner outlet and connected to said fresh air duct adjacent its trailing end, said air induction unit including a plurality of induction vanes positioned in the exhaust gas stream from said burner unit, each of said induction vanes defining an induction passage therein, an inlet opening to said induction passage in said fresh air duct, and an outlet opening from said induction passage in the exhaust gas stream, each of said induction vanes constructed and arranged so that the exhaust gases flowing thereby will induce fresh air from said fresh air duct into the exhaust gases via said induction passages causing additional fresh air from the atmosphere to be drawn into said fresh air duct and through said compressor air impaction unit.

9. An impaction and induction jet engine comprising:
a fresh air duct having a leading end and an trailing end, said fresh air duct open to the atmosphere at its leading end and closed at its trailing end;
a burner unit having a burner inlet and a burner outlet;
a fuel injector means for injecting fuel into said burner unit to form a combustible air-fuel mixture in said burner unit so that the exhaust gases will be directed out of said burner outlet;
an air induction unit connected to said burner unit for receiving the exhaust gases from said burner outlet, said air induction unit connected to said fresh air duct adjacent its trailing end; said air induction unit including a plurality of induction vanes positioned in the exhaust gas stream from said burner unit, each of said induction vanes defining an induction passage therein, an inlet opening to said induction passage in said fresh air duct, and an outlet opening from said induction passage in the exhaust gas stream, each of said induction vanes constructed and arranged so that the exhaust gases flowing thereby will induce fresh air from said fresh air duct into the exhaust gases via said induction passages in said induction vanes as the gases pass through said air induction unit; and, a return exhaust impaction unit connected to said burner outlet so that the exhaust gases pass therethrough after passage through said air induction unit, said exhaust impaction unit including a plurality of exhaust impaction vanes positioned in the exhaust gas stream for separating a portion of the exhaust gases with fresh air induced therein passing through said exhaust impaction unit, each of said exhaust impaction vanes defining an exhaust impaction passage therein, a forwardly facing exhaust inlet opening to said impaction passage in the exhaust gas stream, and an exhaust outlet opening from said exhaust impaction passage operatively connected to said burner inlet to said burner unit so that a portion of the exhaust gases and fresh air passing through said exhaust impaction unit will impact in said exhaust impaction passage and be separated from the exhaust gas stream with the fresh air induced therein to force the separated portion of the exhaust gases and induced fresh air into said burner inlet.

* * * * *